(12) United States Patent
Yang

(10) Patent No.: US 6,714,695 B2
(45) Date of Patent: Mar. 30, 2004

(54) OPTICAL TRANSMISSION SYSTEM EMPLOYING AUTO-SYNCHRONIZED CHIRPED RETURN-TO-ZERO TRANSMITTER

(75) Inventor: Guangning Yang, Clarksville, MD (US)

(73) Assignee: Dorsal Networks, Inc., Columbia, MD (US)

( * ) Notice: Subject to any disclaimer, the term of this patent is extended or adjusted under 35 U.S.C. 154(b) by 0 days.

(21) Appl. No.: 09/953,566

(22) Filed: Sep. 17, 2001

(65) Prior Publication Data

US 2003/0053728 A1 Mar. 20, 2003

(51) Int. Cl.[7] .......................... G02F 1/01; G02F 1/035; H04B 10/04
(52) U.S. Cl. ................. 385/2; 385/1; 385/3; 398/172; 398/173; 398/174; 398/175; 398/179
(58) Field of Search .................. 385/1–3; 398/172–175, 398/179; 359/181, 182, 183, 184, 188

(56) References Cited

U.S. PATENT DOCUMENTS

| | | | |
|---|---|---|---|
| 5,359,678 A | | 10/1994 | Heismann et al. |
| 5,805,321 A | | 9/1998 | Ooi et al. |
| 5,828,477 A | | 10/1998 | Nilsson et al. |
| 5,835,212 A | | 11/1998 | Kissa et al. |
| 5,892,858 A | * | 4/1999 | Vaziri et al. .................. 385/2 |
| 5,912,755 A | | 6/1999 | Bergano |
| 5,946,119 A | | 8/1999 | Bergano et al. |
| 5,991,471 A | | 11/1999 | Yu |
| 6,014,479 A | | 1/2000 | Darcie |
| 6,057,950 A | | 5/2000 | Bergano |
| 6,072,615 A | | 6/2000 | Mamyshev |
| 6,091,864 A | * | 7/2000 | Hofmeister .................. 359/254 |
| 6,091,884 A | | 7/2000 | Yuen et al. |
| 6,310,709 B1 | | 10/2001 | Bergano |
| 6,337,756 B1 | * | 1/2002 | Djupsjobacka .................. 359/181 |
| 2002/0109893 A1 | * | 8/2002 | Givehchi .................. 359/181 |

FOREIGN PATENT DOCUMENTS

| | | |
|---|---|---|
| EP | 0 957 596 A1 | 11/1999 |
| EP | 0 964 538 A2 | 12/1999 |
| EP | 1 041 754 A1 | 10/2000 |

OTHER PUBLICATIONS

Reference "Chirped return to zero source used in 8x10 Gbit/s transmission over 2000km of standard singlemode fibre", Electronic Letters Pub., Aug. 2000, vol. 36, No. 16, pp. 1399–1400.*

Yutaka Miyamoto et al., "320 Gbit/s (8x40 Gbit/s) WDM Transmission over 367–km zero–dispersion–flattened line with 120–km repeater spacing using carrier–suppressed return–to–zero pulse form", pp. 1–3.

Stephane Bourgeols, Lightwave Special Reports, "Fused–fiber developments offer passive foundation for optical slicing", Mar., 2000, pp. 2–3.

(List continued on next page.)

Primary Examiner—John D. Lee
Assistant Examiner—Daniel Valencia

(57) ABSTRACT

A method of modulating an optical signal is provided comprising the steps of providing a first electric field in a first optical signal path, providing a second electric field in a second optical signal path, transmitting an optical signal along the first optical signal path and the second optical signal path, amplitude modulating the optical signal via the first electric field and the second electric field, and phase modulating the optical signal via the first electric field and the second electric field. A clock source and a data source are ANDed to provide a data modulated RF signal on an offset waveguide electrode for generating the first and second electric fields. The magnitude of the electric field of the first electric field in the first optical signal path is greater than the magnitude of the electric field of the second electric field in the second optical signal path.

5 Claims, 6 Drawing Sheets

OTHER PUBLICATIONS

Ravi V. Shankar et al., "Managing the Management Communications Network in Optical Transport Systems" in Bell Labs Technical Journal, Oct.–Dec., 1999, pp. 155–170.

I.P. Kaminow et al., "Optical Fiber Telecommunications IIIB", pp. 74–77 and 390–403.

Naoya Henmi et al., "Prechirp Technique as a Linear Dispersion Compensation for Ultrahigh–Speed Long–Span Intensity Modulation Directed Detection Optical Communication Systems", Oct. 1994, Journal of Lightwave Technology, vol. 12 No. 10.

Product Specifications, "Mar. 10—External Optical Modulator", Codeon Pub., 5 pages.

Ed. L. Wooten et al., "A Review of Lithium Niobate Modulators for Fiber–Optic Communications Systems" of IEEE Journal of Selected Topics in Quantum Electronics, Jan./Feb. 2000, vol. 6, No. 1.

Peter Hallemeier et al., "Next Generation 10Gb/s Lithium Niobate Modulator Components for RZ Based Transmission Techniques" of JDS Uniphase, Dec. 15, 2000, pp. 1–4.

"10.66 Gb/s Chirped RZ Pulse Generator" of JDS Uniphase, pp. 1–4.

"10.66 Gb/s RZ Data Modulator" of JDS Uniphase, pp. 1–4.

"10 Gb/s "Bias Ready" Intensity Modulator", JDS Uniphase, pp. 1, 1, and 1.

Mach 10—External Optical Modulator, "Product Specifications", Codeon Pub., 1 Page.

Fabrizio Forghieri et al., "RZ Versus NRZ in Nonlinear WDM Systems", Jul. 1997, vol. 9, IEEE Photonics Technology Letters, pp. 1035–1037.

Ekaterina A. Golovchenko et al., Transmission Properties of Chirped Return–to–Zero Pulses and Nonlinear Intersymbol Interference in 10 Gb/s WDM Transmission, SN 033540–SN 033542.

M. Imran Hayee, "Techniques to Improve System Performance Against Fiber Nonlinearities in High Speed Wavelength–Division–Multiplexed Systems", University of Southern CA., May, 1999, pp. 1–83.

Reference, "Chirped return–to–zero source used in 8x10 Gbit/s transmission over 2000km of standard singlemode figure", Electronic Letters Pub., Aug. 2000, vol. 36, No. 16, pp. 1399–1400.

AT&T Technical Journal, "Undersea Communications Technology", AT&T Technical Journal, Jan./Feb. 1995, vol. 74, No. 1, pp. 1–102.

"10 Gb/s Zero Chirp Data Modulator with VOA" JDS Uniphase, pp. 1–4.

Eric Swanson et al., "40–GHz Pulse Train Generation Using Soliton Compression of a Mach–Zehnder Modulator Output", IEEE Photonics Technology Letters, vol. 7, No. 1 10/95, pp. 114–116.

Neal S. Bergano et al., "100 Gb/s Error Free Transmission over 9100 km using Twenty 5 Gb/s WDM Channels", pp. 419–422.

* cited by examiner

OPTICAL TRANSMISSION SYSTEM EMPLOYING AUTO-SYNCHRONIZED CHIRPED RETURN-TO-ZERO TRANSMITTER

BACKGROUND OF THE INVENTION

A. Field of the Invention

The invention relates generally to optical transmission systems employing optical modulators, more particularly, to optical modulation comprising phase, amplitude, and data modulation.

B. Background of the Invention

Optical modulation is presently used to encode data packets onto light for transmission in an optical communication system. In conventional systems, data is first modulated into a predetermined protocol by a data modulation device. Data modulation, for example, may comprise a device for converting electrical data packets into optical data packets. To reduce noise and other parameters, simple "1" "0" optical data packets must be further modulated. Amplitude modulation (AM) and phase modulation (PM) are commonly used to further modulate the optical data packet.

Mach-Zehnder type optical modulators are commonly used to provide AM modulation and PM modulation. AM modulators are often called "intensity modulators" as the rise and fall of the amplitude of the optical signal corresponds to the intensity of the optical signal emitted from the optical modulator. The term "chirp" generally refers to the amount of frequency modulation or PM modulation of the optical signal emitted from the optical modulator. Hence chirp intensity modulators, including some Mach-Zehnder type optical modulators, provide both AM and PM modulation of an optical signal. One such chirp intensity modulator is the JDS Uniphase® 10.66 Gb/s chirped return to zero (RZ) pulse generator.

Conventional optical communication systems first data modulate an optical signal, then use an AM/PM modulator device to further modulate the data modulated optical signal. One problem with conventional optical systems employing separate data modulators and AM/PM modulators is that multiple clock sources are used which have to be properly synchronized to be able to decode the data at a receiver. Clock synchronization adds to the complexity of conventional systems. Hence, a need exists for a device that provides data modulation, AM modulation, and PM modulation of an optical signal all within a single device.

SUMMARY OF THE INVENTION

The present invention is intended to improve on one or more of the problems described above, and other problems with the prior art.

According to a first aspect of the present invention, an optical modulator is provided comprising a first optical signal path, a second optical signal path, an offset waveguide electrode positioned between the first optical signal path and the second optical signal path, and an RF data modulator driver connected to the offset waveguide electrode. The RF data modulator driver comprises an AND GATE having a first input connected to a clock and a second input connected to a data source. The RF data modulator driver is adapted to provide a data modulated RF signal along the offset waveguide electrode causing an electric field to be generated along the first optical signal path and the second optical signal path. The electric field performs amplitude modulation, data modulation, and phase modulation of an optical signal propagating along the first optical signal path and the second optical signal path. Preferably, the clock is biased to adjust the rise and fall time of the output of the AND GATE.

According to another aspect of the present invention, a method of modulating an optical signal is provided comprising the steps of providing a first electric field in a first optical signal path by at least an offset waveguide electrode, providing a second electric field in a second optical signal path by at least the offset waveguide electrode, transmitting an optical signal along the first optical signal path and the second optical signal path, ANDing a clock source and a data source to provide a data modulated RF signal on the offset waveguide electrode, amplitude modulating the optical signal via the first electric field and the second electric field, and phase modulating the optical signal via the first electric field and the second electric field. The second optical signal path is positioned adjacent to the first optical signal path. The offset waveguide electrode is positioned between the first optical signal path and the second optical signal path. The magnitude of the electric field of the first electric field in the first optical signal path is greater than the magnitude of the electric field of the second electric field in the second optical signal path.

Preferably, the steps of providing a first electric field and providing a second electric field are performed by an X-Cut $LiNbO_3$ type optical modulator. More preferably, an optical signal is formatted to a data transmission protocol, wherein the step of providing an optical signal along a first optical signal path and a second optical signal path provides a formatted optical signal on the first optical signal path and the second optical signal path.

According to another aspect of the present invention, an optical data modulator is provided comprising an electrode positioned adjacent to an optical path, and an electrical data modulator driver. The electrical data modulator driver comprises a first input connected to a clock source, a second input connected to a data source, and an output connected to the electrode. The electrical data modulator drier provides a data modulated electrical signal propagating along the electrode. The electrode data modulates an optical signal propagating along the optical path via at least one electric field responsive to the data modulated electrical signal. Preferably, the optical signal propagating along the optical path is modulated to a chirped return to zero (RZ) protocol.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

In the following description, for the purposes of explanation and not limitation, specific details are set forth, such as particular systems, networks, software, components, techniques, etc., in order to provide a thorough understanding of the present invention. However, it will be apparent to one skilled in the art that the present invention may be practiced in other embodiments that depart from these specific details. In other instances, detailed descriptions of known methods, devices and circuits are abbreviated or omitted so as not to obscure the present invention.

Figure 1:
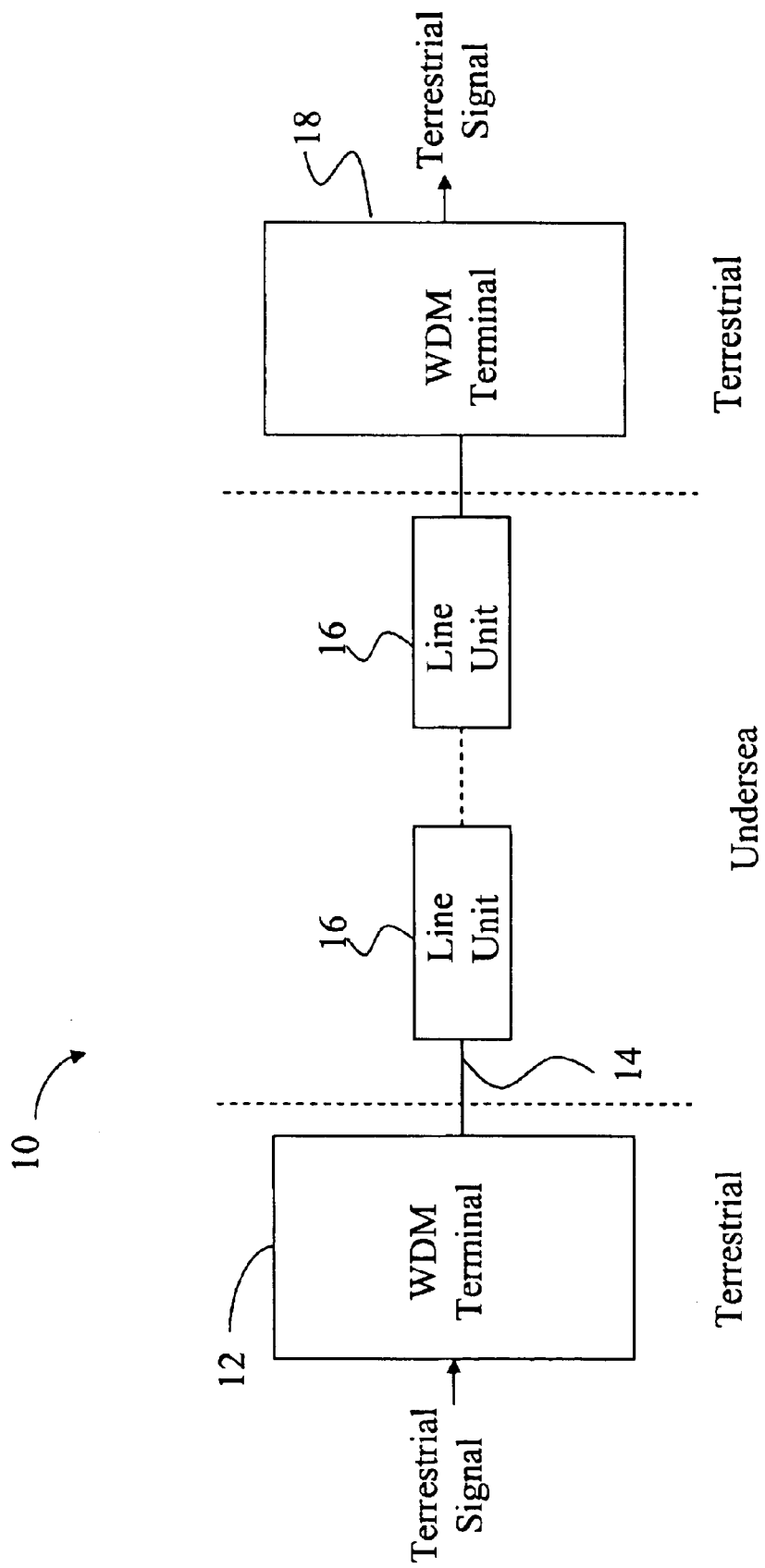
FIG. 1 is a schematic diagram of an optical communication system in which the present invention can be implemented.

Methods and systems for increasing performance in Raman-amplified optical communication systems can be employed in systems such as those depicted in FIG. 1, i.e., submarine optical communication systems, or in terrestrial systems. For the purpose of illustration, rather than limitation, an exemplary Raman-amplified system is described below for context. Those skilled in the art will appreciate that many different system configurations could also implement the present invention.

For long haul optical communications, e.g., greater than several hundred kilometers, the optical signal must be periodically amplified to compensate for the tendency of the data signal to attenuate. For example, in the submarine optical communication system 10 shown in FIG. 1, the terrestrial signal is processed in WDM terminal 12 for transmission via optical fiber 14. Periodically, e.g., every 75 km, a line unit 16 amplifies the transmitted signal so that it arrives at WDM terminal 18 with sufficient signal strength (and quality) to be successfully transformed back into a terrestrial signal.

Figure 2:
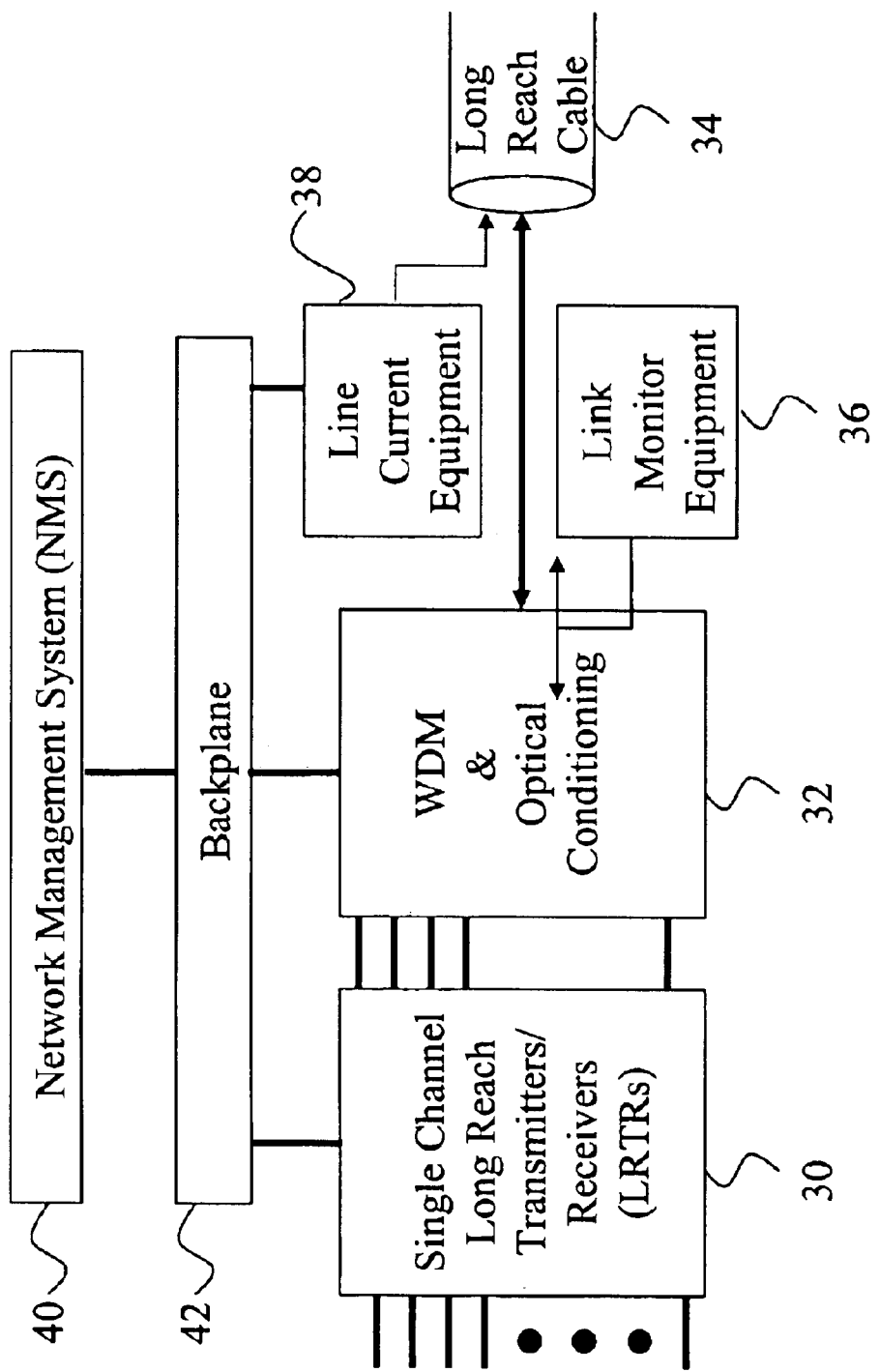
FIG. 2 is a block diagram of an exemplary terminal unit of an optical communication system including link monitoring equipment according to exemplary embodiments of the present invention.

An exemplary architecture for terminal 12 and 18 is provided in the block diagram of FIG. 2. Therein, the long reach transmitters/receivers (LRTRs) 30 convert terrestrial signals into an optical format for long haul transmission, convert the undersea optical signal back into its original terrestrial format and provide forward error correction. As will be described in more detail below, modulators are employed in the LRTRs 30 for converting the terrestrial signals. The WDM and optical conditioning unit 32 multiplexes and amplifies the optical signals in preparation for their transmission over cable 34 and, in the opposite direction, demultiplexes optical signals received from cable 34. The link monitor equipment 36 monitors the undersea optical signals and undersea equipment for proper operation. The line current equipment 38 provides power to the undersea line units 36. The network management system (NMS) 40 controls the operation of the other components in the WDM terminal, as well as sending commands to the line units 36 via the link monitor equipment 36, and is connected to the other components in the WDM terminal via backplane 42.

Figure 3:
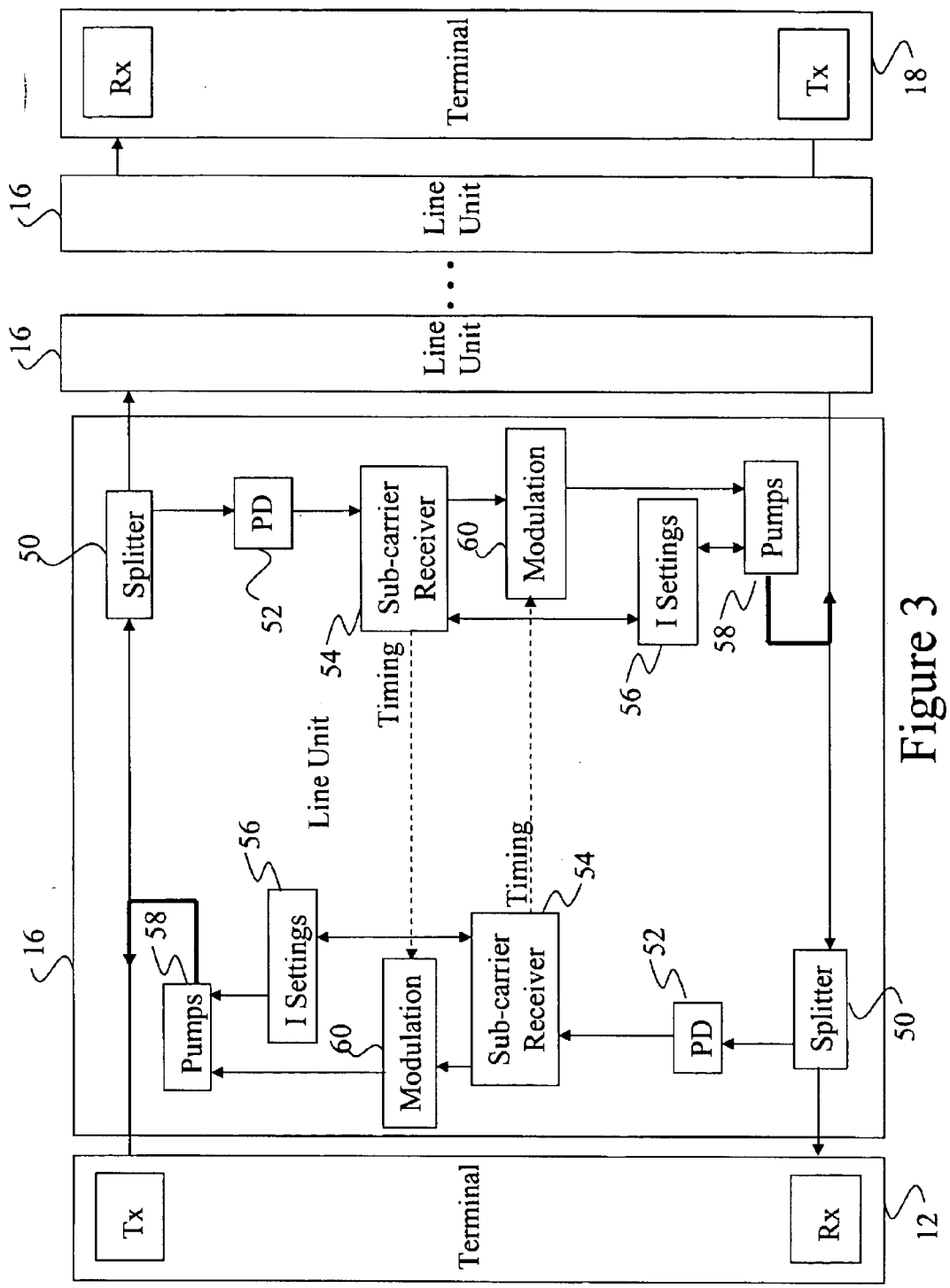
FIG. 3 is a block diagram of an exemplary line unit of an optical communication system in which the present invention can be implemented.

Functional blocks associated with an exemplary line unit 16 are depicted in FIG. 3. Therein, each fiber has a splitter 50 connected thereto to sample part of the traveling WDM data signal. The splitters 50 can, for example, be implemented as 2% tap couplers. A photodetector 52 receives the sampled optical signal from its respective splitter 50 and transforms the optical signal into a corresponding electrical signal. The photodetector 52 outputs the electrical signal to a corresponding sub-carrier receiver unit 54, which detects and decodes the commands present in the sub-carrier modulated monitoring signal that has been modulated on the envelope of the WDM data signal. After decoding the command, the particular sub-carrier receiver 54 determines whether the decoded command is intended for it. If so, the action in the command is executed, e.g., measuring the power of the WDM signal, measuring the pump power output from one or more lasers in the pump assembly, or changing the supply current to the lasers of the pump assembly. To this end, the sub-carrier receivers 54 are connected to respective current control and power monitoring units (I settings) 56, which each include pump power monitors and pump current controls for each laser in the associated pump laser assembly 58.

Figure 4:
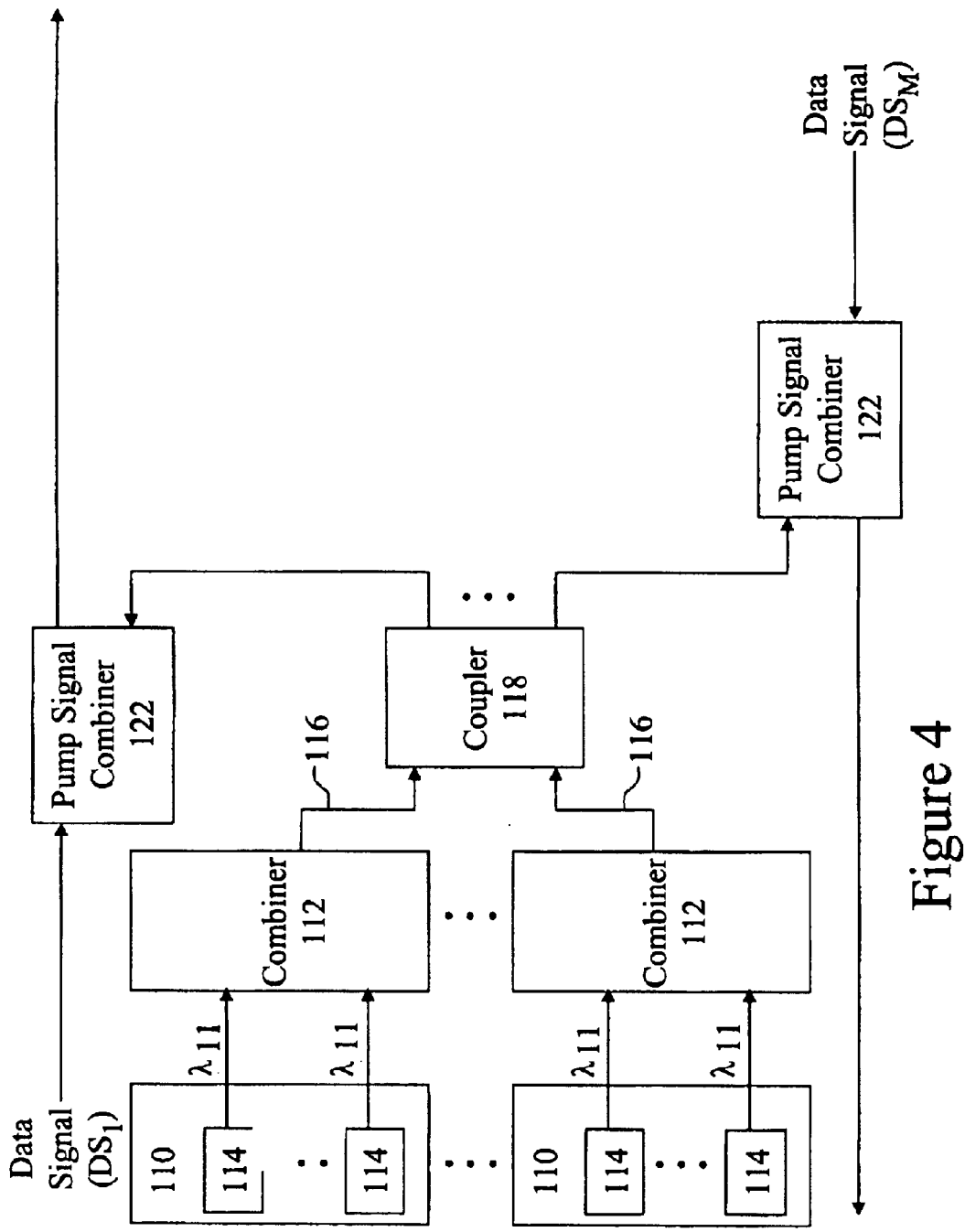
FIG. 4 is another block diagram of an exemplary line unit of an optical communication system including an exemplary Raman pumping architecture.

The pump modules 58 provide pump light into the optical fibers to amplify the data signals traveling therein using a Raman amplification scheme, as generally described above. The gain profile for a single pump wavelength has a typical bandwidth of about 20–30 nm. For high capacity WDM communication applications, such a bandwidth is too narrow and, accordingly, multiple pump wavelengths can be employed to broaden the gain profile. FIG. 4 depicts an exemplary pump architecture for providing multiple pump wavelengths in a Raman amplification scheme.

Therein, a number N of pump radiation sources 110 are optically coupled to a respective one of N pump radiation combiners 112. Each of the pump radiation sources 110 generate various pump wavelengths at various pump powers using individual radiation emitters 114. The individual radiation emitters 114 can, for example, be lasers, light emitting diodes, fiber lasers, fiber coupled microchip lasers, or semiconductor lasers. The combiners 112 combine the various outputs of their respective pump radiation sources, e.g., by wave division multiplexing, and outputs the combined optical pumping signal to coupler 118. Coupler 118 can be an N×M coupler which takes contributions from all N inputs to provide a representative output at each of M output ports. Energy from the coupler 118 is pumped into the optical fiber(s) via pump signal combiners 122. In general, Raman pump architectures couple the light generated by pump lasers at various wavelengths and various powers to the optical fibers to pump the optical data signals. Those skilled in the art will appreciate that many other types of pumping architectures can be employed to provide Raman amplification to optical data signals in accordance with the present invention.

As mentioned above, this modulator can be used, for example, in the terminals 12 and 18 of an undersea optical communication system. However, those skilled in the art will appreciate that modulators according to the present invention are not limited to such applications and can, for example, be employed in terrestrial optical communication systems. A first exemplary embodiment of an optical AM/PM modulator 190 according to the present invention is shown by the block diagram of FIG. 5.

An optical signal enters the optical modulator via optical fiber 100. The optical signal is then provided on both a first optical signal path 160 and a second optical signal path 170. The optical signal propagates along optical signal paths 160 and 170, and are coupled into optical fiber 160 as an AM/PM modulated optical signal.

An offset waveguide electrode 140 is used to perform the AM/PM modulation of the optical signal propagating along optical signal paths 160 and 170. The offset waveguide electrode 140 is positioned between the first optical signal path 160 and second optical signal path 170. An RF source 130 is coupled to the offset waveguide electrode 140 to provide an RF signal along the offset waveguide electrode, and is terminated by termination 150. Electrical grounds 110 and 120 are positioned adjacent to the first optical signal path 160 and the second optical signal path 170 respectively. Preferably, the optical modulator 190 is an X-Cut LiNbO$_3$ type optical modulator.

Figure 5:
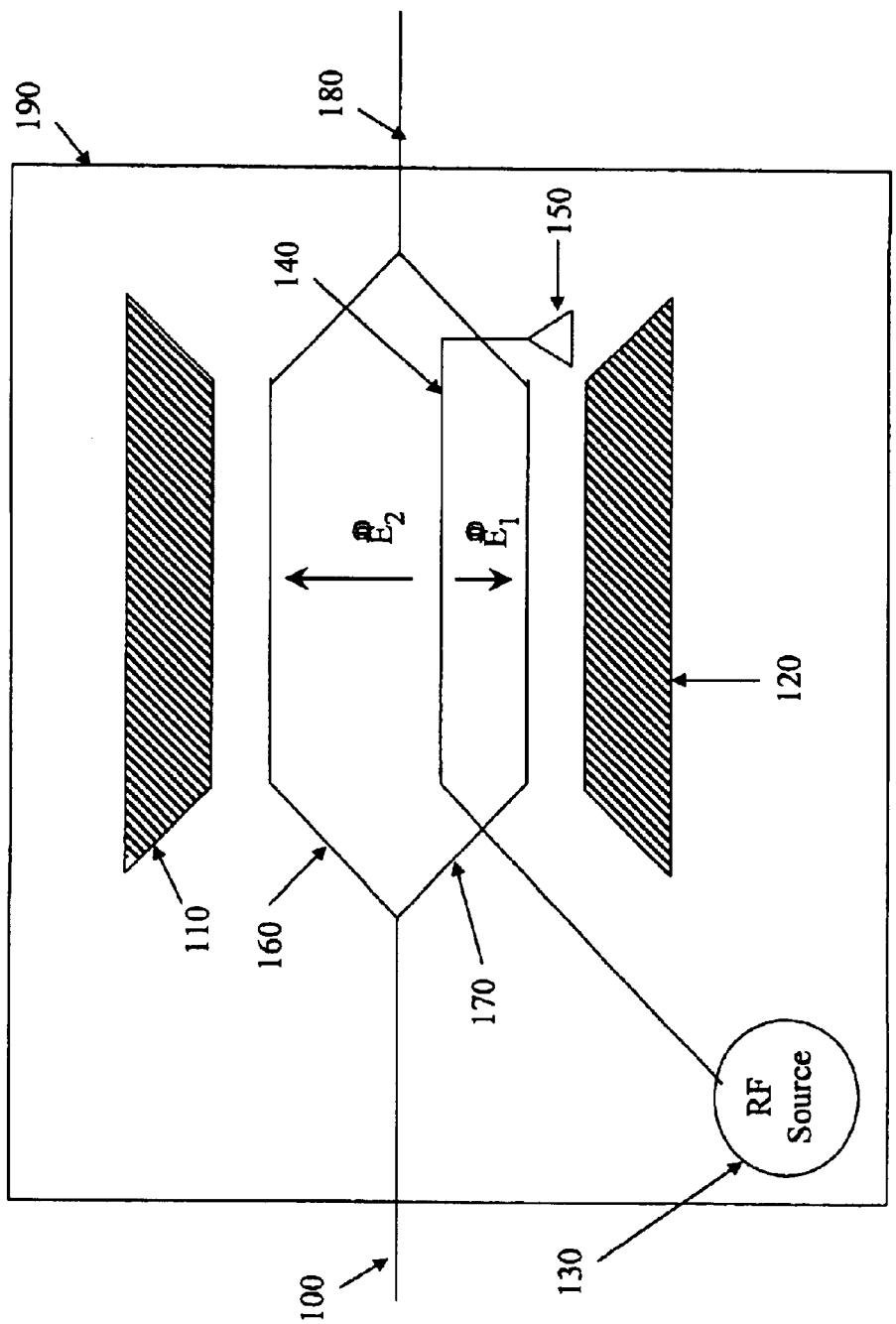
FIG. 5 is a block diagram of a first embodiment of an optical AM/PM modulator according to the present invention.

The function of the AM/PM modulator according to the present invention will now be described in reference to FIG. 5. The RF signal propagating along the offset waveguide electrode 140 creates a pair of electric fields $E_1$ and $E_2$ within the modulator. FIG. 5 shows $E_2$ applied to first optical signal path 160, and $E_1$ applied to second optical signal path 170. As the RF signal changes in amplitude, electric fields $E_1$ and $E_2$ correspondingly change in strength. The first optical signal path 160 and the second optical signal path 170 are subjected to the varying electric fields $E_1$ and $E_2$ respectively, thereby subjecting photons of light propagating along the first and second optical signal paths 160 and 170 to varying electromagnetic forces. These varying electromagnetic forces AM modulate the optical signal which is propagating on optical fiber 160.

PM modulation of the optical signal is performed by positioning the offset waveguide electrode 140 such that the magnitude of the electric field $E_2$ in the first optical signal path 160 is unequal to the magnitude of the electric field $E_1$ in the second optical signal path 170. Subjecting the first optical signal path 160 and the second optical signal path 170 to different magnitudes of the electric fields $E_1$ and $E_2$, generates a residual phase difference between the first optical signal path 160 and the second optical signal path 170 as they are coupled into the optical fiber 180. Hence, the optical signal is effectively AM/PM modulated by the optical modulator 190.

Figure 6:
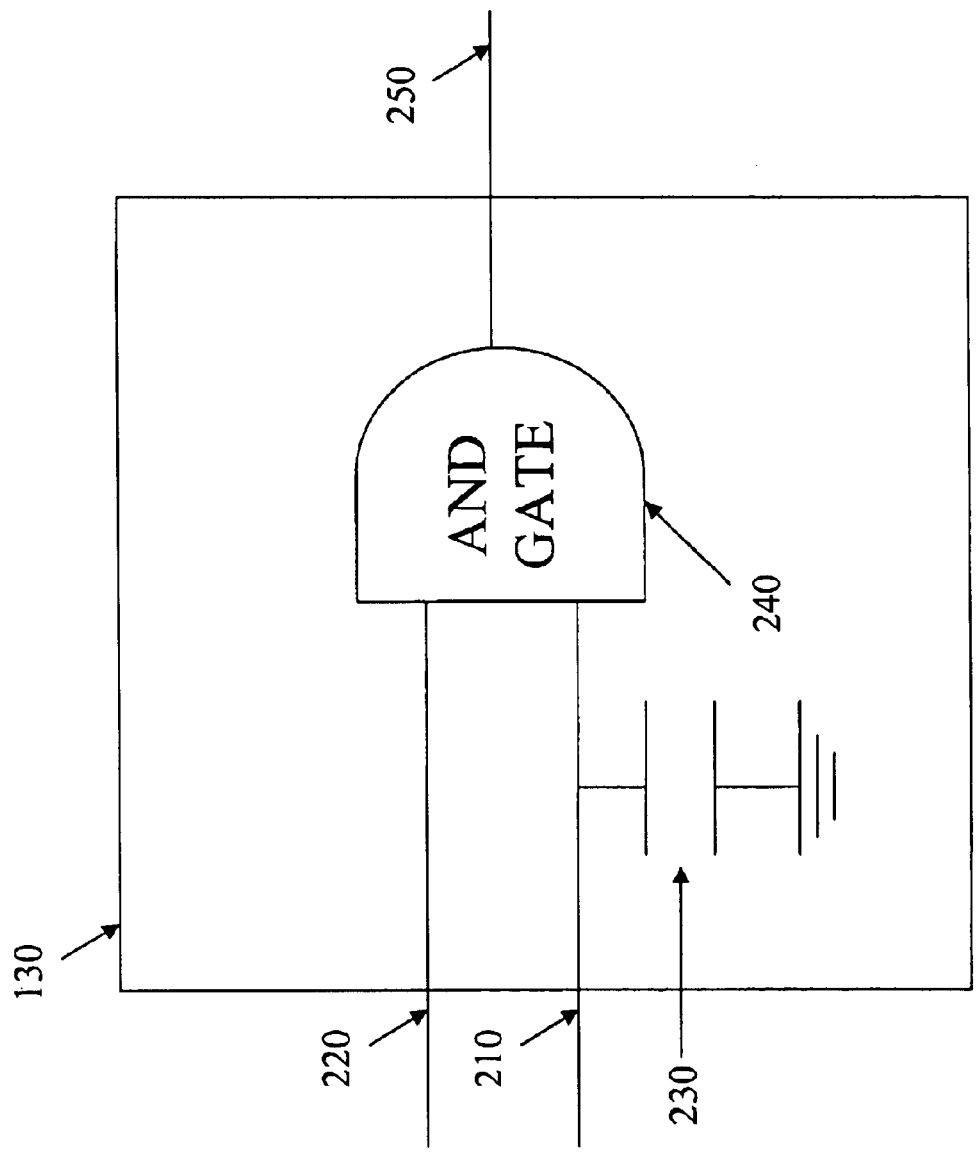
FIG. 6 is a block diagram of an RF data modulator driver according to the present invention.

According to this first embodiment, the RF source 130 can be data modulated to provide AM/PM and data modulation all within a single device. As shown in FIG. 6, the RF source may comprise an AND GATE 240 for data modulating the RF signal applied to the offset waveguide electrode 140 (FIG. 1). A first input 220 of the AND GATE 240 is connected to a data source, such as a networking packet framer. A second input 210 of the AND GATE 240 is connected to an RF clock source, such as an oscillating crystal or timing chip. The clock may be biased 230 to allow for adjustment of the modulation, as biasing the clock will alter the effective duty cycle for the AND GATE 240 by altering the point at which the AND GATE 240 switches due to clock transitions. An output 250 of the AND GATE 240 is connected to the offset waveguide electrode 140 (FIG. 5), thereby providing a data modulated RF signal onto the offset waveguide electrode 140. As only one clock source need be used, an optical modulator according to the present invention does not require clock synchronization for the modulator.

The data modulated RF signal creates data modulated and amplitude varying electromagnetic fields $E_1$ and $E_2$ which data modulate and AM modulate the optical signal propagating along the first branch path 160 and second branch path 170. As previously described, offsetting the waveguide electrode 140 provides the PM modulation. Hence, the present invention provides data modulation, AM modulation, and PM modulation all within a single device.

Thus, an optical modulator that phase, amplitude, and data modulates an optical signal in a single device has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. A method of modulating an optical signal comprising the steps of:

providing a first electric field in a first optical signal path by at least an offset waveguide electrode;

providing a second electric field in a second optical signal path by at least said offset waveguide electrode, the second optical signal path positioned adjacent to said first optical signal path;

transmitting an optical signal along said first optical signal path and said second optical signal path;

ANDing a clock source and a data source to provide a data modulated RF signal on the offset waveguide electrode;

amplitude modulating the optical signal via said first electric field and said second electric field;

phase modulating the optical signal via said first electric field and said second electric field, providing an RF signal on said offset waveguide electrode; and adjusting the rise and fall time of the RF signal to control at least one of the amplitude modulating and phase modulating of the optical signal, wherein said offset waveguide electrode is positioned between said first optical signal path and said second optical signal path, wherein the magnitude of the electric field of said first electric field in said first optical signal path is greater than the magnitude of the electric field of said second electric field in said second optical signal path, and wherein ANDing a clock source and a data source, amplitude modulating the optical signal, and phase modulating the optical signal are all performed simultaneously in a single stage optical modulator.

2. The method of claim 1, wherein the steps of providing a first electric field and providing a second electric field are performed by an X-Cut LiNbO$_3$ type optical modulator.

3. The method of claim 1, further comprising the step of: formatting the optical signal to a data transmission protocol, wherein the step of providing an optical signal along a first optical signal path and a second optical signal path provides a formatted optical signal on said first optical signal path and said second optical signal path.

4. The method of claim 1, further comprising the step of: biasing the clock source.

5. The method of claim 1, wherein the amplitude modulating and phase modulating steps provide a chirped return to zero (RZ) modulated optical signal.

* * * * *